United States Patent
Geissenhoener

(10) Patent No.: US 8,909,461 B2
(45) Date of Patent: Dec. 9, 2014

(54) METHOD FOR OPERATING A MOTOR VEHICLE WITH AUTOMATIC ENGINE SHUT-OFF

(75) Inventor: Martin Geissenhoener, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/131,825

(22) PCT Filed: Jun. 29, 2012

(86) PCT No.: PCT/EP2012/002734
§ 371 (c)(1),
(2), (4) Date: Jan. 9, 2014

(87) PCT Pub. No.: WO2013/007347
PCT Pub. Date: Jan. 17, 2013

(65) Prior Publication Data
US 2014/0149022 A1    May 29, 2014

(30) Foreign Application Priority Data
Jul. 9, 2011 (DE) .......................... 10 2011 107 005

(51) Int. Cl.
G06F 19/00  (2011.01)
B60K 28/04  (2006.01)
B44D 3/18   (2006.01)
F02D 29/02  (2006.01)
B60K 28/12  (2006.01)

(52) U.S. Cl.
CPC ............... *F02D 29/02* (2013.01); *B60K 28/04* (2013.01); *B60W 2530/14* (2013.01); *B44D 3/18* (2013.01); *B60K 28/12* (2013.01)
USPC ........................ 701/112; 701/115; 123/198 F

(58) Field of Classification Search
CPC ........ F02D 41/041; F02D 41/04; B60K 28/00
USPC .................. 701/101, 112, 113, 114, 115; 123/179.1, 198 F; 180/272, 273
See application file for complete search history.

(56) References Cited

U.S. PATENT DOCUMENTS 5,219,413 A     6/1993  Lineberger
8,428,855 B2 *  4/2013  Okumoto et al. ............. 701/113

(Continued)

FOREIGN PATENT DOCUMENTS

| DE | 102 11 462 C1    | 7/2003 |
| DE | 10 2007 009 831 A1 | 9/2008 |
| DE | 10 2007 009 856 A1 | 9/2008 |
| DE | 10 2007 009 870 A1 | 9/2008 |
| GB | 2 424 505 A      | 9/2009 |
| WO | 2006/027514 A1   | 3/2006 |

OTHER PUBLICATIONS

International Search Report mailed Dec. 10, 2012 in corresponding International Application No. PCT/EP2012/002734.

(Continued)

Primary Examiner — John Kwon
(74) Attorney, Agent, or Firm — Staas & Halsey LLP

(57) ABSTRACT

An automatic shut-off of the engine of a motor vehicle is only activated if the motor vehicle has been moved according to a specific criterion after the last starting procedure of the engine. The undesired shut-off of an engine can thus be prevented in some situations, such as e.g. when a garage is being opened or when ice is being scraped off the windows of a motor vehicle.

9 Claims, 1 Drawing Sheet

(56) References Cited

U.S. PATENT DOCUMENTS

| | | | |
|---|---|---|---|
| 8,773,136 B2 * | 7/2014 | Fricke et al. | 324/433 |
| 2007/0245997 A1 | 10/2007 | Levasseur et al. | |
| 2007/0267238 A1 | 11/2007 | Guy et al. | |
| 2010/0070128 A1 * | 3/2010 | Johnson | 701/33 |
| 2010/0282200 A1 * | 11/2010 | Notani et al. | 123/179.3 |

OTHER PUBLICATIONS

English Language Translation of Written Opinion PCT/EP2012/002734, downloaded from WIPO website Jan. 9, 2014, 6 pages.

German Office Action for German Priority Patent Application No. 10 2011 107 005.6, issued Jul. 30, 2012, 5 pages.

* cited by examiner

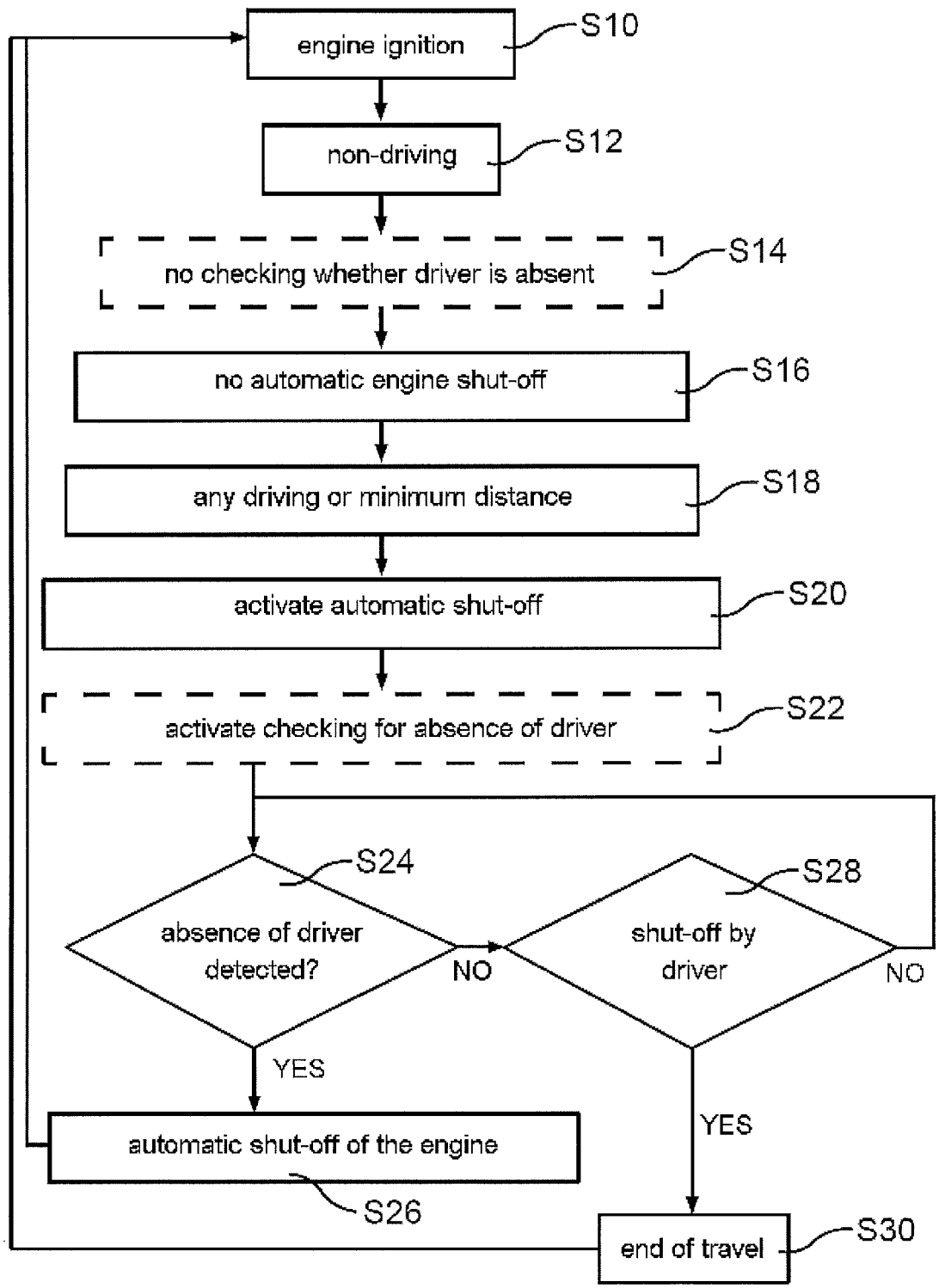

METHOD FOR OPERATING A MOTOR VEHICLE WITH AUTOMATIC ENGINE SHUT-OFF

CROSS REFERENCE TO RELATED APPLICATIONS

This application is based on and hereby claims priority to International Application No. PCT/EP2012/002734 filed on Jun. 29, 2012 and German Application No. 10 2011 107 005.6 filed on Jul. 9, 2011, the contents of which are hereby incorporated by reference.

BACKGROUND

The invention relates to a method for operating a motor vehicle having an engine.

U.S. Pat. No. 5,219,413 A and GB 2 424 505 A disclose that, when the engine is running, it is checked according to a first predetermined criterion whether a driver of the motor vehicle is present, that is to say in particular is seated on the driver's seat of the motor vehicle. When absence of the driver is detected an automatic shut-off of the engine takes place.

The previous implementations of this method have the disadvantage that in many situations a shut-off of the engine takes place even if this is not actually desired. A typical case here is scratching away ice after an initial start: the driver of the vehicle enters the vehicle, starts the engine and then leaves the vehicle again in order to scratch ice away from the windows of the motor vehicle. It is actually desired here that warm air generated by the heating engine assist the removal of the ice. Depending on the climatic conditions, an initial start can also be intentionally initiated by the driver in order to prepare for a subsequent journey with the motor vehicle by facilities in the vehicle—for example the engine can be allowed to warm up or through a stationary-state air-conditioning system it is possible to ensure that the passenger compartment is heated up (or conversely cools down). Under certain circumstances, a battery of the motor vehicle is also to be heated up.

It may also be the case that the driver of the motor vehicle stops in front of a garage in order to open it but that he does not want the engine to be shut off. In the case of automatic shut-off of the engine, he would then initiate a restart, but the engine would be shut off again immediately.

WO 2006/027514 A1 discloses methods in which the engine is shut off automatically when the driver leaves the motor vehicle. In order to avoid resulting dangerous situations, WO 2006/027514 A1 describes a method for prohibiting the automatic shut-off of the engine of a motor vehicle when a driver is absent. In this method, when the engine is running and absence of a driver is detected the engine is not shut off automatically. Furthermore, when the engine is shut off and absence of a driver is detected the engine is switched on automatically. If the driver is absent for a minimum time period, the engine can nevertheless be shut off automatically. There is provision that after this automatic shut-off the engine cannot be started again automatically, but a starting code has to be input.

DE 10 2007 009 870 A1 describes a method for automatically controlling a switch-on and/or deactivation process of an internal combustion engine of a motor vehicle by a start/stop device with the inclusion of various criteria such as, for example, the presence of the driver or the activation of a cruise control system.

SUMMARY

One potential object is to provide a method for operating a motor vehicle which allows for the fact that an automatic shut-off of the engine is not desired in all situations.

According to the inventor's proposal, the automatic shut-off occurs only if the motor vehicle was moved according to a second predetermined criterion after the engine was last started (ignition).

The inventor's proposal is based on the realization that both the initial start and the restart after an automatic shut-off do not directly result in driving with the motor vehicle whenever the automatic shut-off is not desired; or expressed the other way round: the automatic shut-off is always desired precisely when the driver of the vehicle leaves the motor vehicle at the end of a journey.

In one preferred embodiment, the predetermined second criterion includes the fact that the motor vehicle was moved at all, which is detected, for example, from the activation of an accelerator pedal (gas pedal), from the release of the handbrake or the like. The predetermined second criterion can equally also include the fact that the motor vehicle must have been moved over a minimum distance or else for a minimum time period, because as a result it is possible to prevent the automatic shut-off being initiated immediately when the motor vehicle was moved only briefly over a minimum distance.

If the checking according to the first predetermined criterion to determine whether a driver of the motor vehicle is present takes place exclusively for the purpose of possibly triggering the automatic shut-off, checking according to the first predetermined criterion is not necessary at all if the motor vehicle has not yet been moved. Accordingly, a preferred embodiment can be used to avoid excessive checking of said motor vehicle only if a movement of the motor vehicle has started or as soon as the second predetermined criterion is satisfied. As an alternative to this, the checking can take place in order to emit a warning signal so that a driver leaving the motor vehicle knows that an automatic shut-off is not taking place.

The first predetermined criterion can include, in a manner known per se, the fact that a) no pedals and/or other operator controls are activated (which can be detected, for example, at the brake pedal), that, in addition, alternatively or, in particular, additionally b) a seatbelt lock of the driver is opened, and that, in addition, alternatively or, in particular, additionally c) a driver's door was opened.

In particular on considering overall the fact that no pedal is activated, the seatbelt lock of the driver is opened and a driver's door was opened, it is possible to infer that the driver of the vehicle has stopped activating the pedals, released his seatbelt (or not even put it on) and has left the vehicle through the driver's door. The first predetermined criterion can alternatively also include the fact that a seat occupancy sensor does not in fact detect the presence of the driver. The same applies alternatively or additionally to a camera directed at the driver's seat (with an image recognition device which is integrated or arranged downstream).

BRIEF DESCRIPTION OF THE DRAWING

These and other objects and advantages of the present invention will become more apparent and more readily appreciated from the following description of the preferred embodiments, taken in conjunction with the accompanying drawing of which:

The single FIGURE shows a flowchart explaining a possible embodiment of the proposed method.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

First, in S10, the ignition of an engine of a motor vehicle is activated, and the engine is therefore started or switched on. In S12, a phase of non-driving of the motor vehicle then follows either for a short time or else a relatively long time. When the engine is running, it is subsequently checked here whether the driver is absent. This checking is, however, optionally completely deactivated in S14. However, in particular during the phase of non-drive, according to S16 no automatic shut-off of the engine takes place either because owing to S14 there is no checking at all for the absence of the driver, or if absence of the driver is sensed it does not result in an automatic shut-off of the engine.

In S18, the motor vehicle is then driven and it is detected whether driving is taking place at all. As an alternative to this it is detected that the driving of the motor vehicle takes place over a minimum distance or for a minimum time period. If this is the case, in S20 the function of an automatic shut-off of the engine is activated. If, according to S14, the option of no checking taking place for the absence of the driver during the non-driving was provided, in S22 the checking for absence of the driver is now activated.

In S24 it is now checked whether the absence of the driver was detected according to a specific criterion.

For example, the absence of the driver can be detected from the fact that the driver of the vehicle does not activate the brake, that the seatbelt lock is not closed, that is to say that no-one has put on the seatbelt on the driver's seat, and that the door of the vehicle was opened sometime after S18 (and, if appropriate, closed again). If the absence of the driver is detected, an automatic shut-off of the engine takes place in S26.

As long as absence of the driver is not detected, in S28 it is checked whether the driver of the vehicle has possibly shut off the engine himself. If this is the case, travel ends in S30. If this is not the case, S28 is carried out repeatedly until S26 or S30 follows at some time.

After s S26 and S30, the method cannot be repeated until starting next occurs according to S10.

The fact that the function of the automatic shut-off of the engine is not activated until after the motor vehicle is driven ensures that a driver of a vehicle can switch on the ignition and then leave the motor vehicle if he does not yet wish to drive off, without the engine automatically being shut off. It may in fact be desired that the engine continues running, for example for the purpose of air-conditioning the passenger compartment, or controlling the temperature of a battery, or warming up or heating the vehicle windows for the purpose of deicing them; or it may even be the case that the driver of the vehicle wishes, for example, simply to open a garage door in order subsequently to drive the vehicle into the garage.

If S14 and S22 are not carried out, in the phase of non-driving it is also optionally possible in fact for checking for the absence of the driver to take place. However, if the absence of the driver is detected, the automatic shut-off of the engine does not in fact take place; instead, a warning signal can be output, for example, visually or acoustically or in a combined fashion, in order to inform the driver of the vehicle that a shut-off of the engine would per se take place because the driver has left the vehicle.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating a motor vehicle having an engine, comprising:
    checking the motor vehicle according to a first predetermined criterion when the engine is running, to detect whether a driver of the motor vehicle is present;
    checking the motor vehicle according to a second predetermined criterion to detect whether the motor vehicle was moved after the engine was last started; and
    performing an automatic shut-off of the engine when checking according to the first predetermined criterion detects that the driver is absent, the automatic shut-off being performed only if checking according to the second predetermined criterion detects that the motor vehicle was moved after the engine was last started.

2. The method as claimed in claim 1, wherein checking according to the second predetermined criterion checks whether the motor vehicle was moved at all after the engine was last started.

3. The method as claimed in claim 1, wherein checking according to the second predetermined criterion checks whether the motor vehicle was moved more than a minimum distance after the engine was last started.

4. The method as claimed in claim 1, wherein checking according to the second predetermined criterion checks whether the motor vehicle was in motion for at least minimum time period after the engine was last started.

5. The method as claimed in claim 1, wherein checking according to the first predetermined criterion takes place only if checking according to the second predetermined criterion detected that the motor vehicle was moved after the engine was last started.

6. The method as claimed in claim 1, wherein checking according to the first predetermined criterion is performed after checking according to the second predetermined criterion.

7. The method as claimed in claim 1, wherein checking according to the first predetermined criterion takes place regardless of whether the motor vehicle was moved after the engine was last started, and
    if checking according to the first predetermined criterion detected that the driver is absent and checking according to the second predetermined criterion detected that the motor vehicle was not moved after the engine was last started, then the automatic shut-off is prohibited and a warning signal is output.

8. The method as claimed in claim 1, wherein the first predetermined criterion is at least one criterion selected from the group consisting of:
    no pedals are activated,
    no operator controls are activated,
    a seatbelt lock of the driver is opened, and
    a driver's door was opened.

9. The method as claimed in claim 1, wherein checking according to the first predetermined criterion uses a seat occupancy sensor and/or a camera directed at a driver's seat to detect whether the driver of the motor vehicle is present.

* * * * *